United States Patent [19]

Hood

[11] Patent Number: 5,341,759

[45] Date of Patent: Aug. 30, 1994

[54] SEA BIRD DETERRENT FOR BOATS AND NAVIGATION AIDS

[76] Inventor: Roger W. Hood, 15 Durfee Ct., Somerset, Mass. 02726

[21] Appl. No.: 636,768

[22] Filed: Jan. 2, 1991

[51] Int. Cl.⁵ .............................................. B63B 21/52
[52] U.S. Cl. .................................... 114/255; 114/343; 441/1; 52/101
[58] Field of Search ............... 114/255, 343, 364, 222, 114/221 R; 441/1, 16; 52/101; 136/244, 243, 291

[56] References Cited

U.S. PATENT DOCUMENTS

| | | | |
|---|---|---|---|
| 996,545 | 6/1911 | Warner | 441/1 |
| 1,037,111 | 8/1912 | Bethel | 441/1 |
| 2,413,918 | 1/1947 | Harris | 114/255 |
| 3,292,319 | 12/1966 | McCarthy | 52/101 |
| 3,416,266 | 12/1968 | Eron | 52/101 |
| 3,802,214 | 4/1974 | Prieto | 114/255 |
| 4,143,437 | 3/1979 | Voykin | 441/1 |
| 5,066,256 | 11/1991 | Ward | 441/16 |

FOREIGN PATENT DOCUMENTS 8957 of 1906 United Kingdom .................. 52/101

OTHER PUBLICATIONS

Charness, Larry, "Bacteria Remediation, A Complex Problem-An Inexpensive Solution", Sep. 11, 1989.

*Primary Examiner*—Stephen P. Avila
*Attorney, Agent, or Firm*—Fish & Richardson

[57] ABSTRACT

A boat or navigation aid including a top, at least two posts extending upward from the top, and at least one line between the posts to prevent sea birds from landing on the top.

11 Claims, 2 Drawing Sheets

SEA BIRD DETERRENT FOR BOATS AND NAVIGATION AIDS

BACKGROUND OF THE INVENTION

The invention relates to deterring sea birds from landing on boats and navigation aids.

Sea birds, e.g., sea gulls and, in some locations, cormorants, often land on the tops of motor boats and on navigation aids (e.g., buoys providing visual and/or audible alarms, whether electrically powered or not) and leave droppings that often need to be removed, sometimes with great effort and considerable health hazard. In some installations, e.g., where a solar panel is employed to charge batteries which power a light or alarm, the droppings can obscure the solar panel and interfere with its proper operation.

SUMMARY OF THE INVENTION

The invention features, in general, protecting boats and navigation aids by installing at least two posts that extend upward from the top of the boat or navigation aid and at least one line between the posts to prevent sea birds from landing on the top.

In preferred embodiments, there are at least three or four posts and lines between the posts around the perimeter of the top. Where the area within the perimeter is sufficiently large, lines may be strung at two elevations between the posts, and there can be a line dividing the open area, though typically only at one elevation. The posts can be secured to handrails at the hard tops of boats, directly to the hard tops of boats, to frames supporting soft tops of boats, to the tops of buoys or land-based navigation aids, to the edge portions of horizontal solar panels at the tops of navigation aids, or to a top between the top edges of inclined solar panels. The posts preferably are ⅜" or so diameter aluminum rod, and the lines usually are provided at between 5" and 10" and between 15" and 20" above the top. The lines preferably are marine grade nylon, Dacron or other polyester lines approximately 3/32" in diameter. The line could be braided line. The posts could be other material such as fiberglass.

Other advantages and features of the invention will be apparent from the following description of the preferred embodiments thereof and from the claims.

DESCRIPTION OF THE PREFERRED EMBODIMENTS

The preferred embodiments will now be described.

DRAWINGS

STRUCTURE

Figure 1:
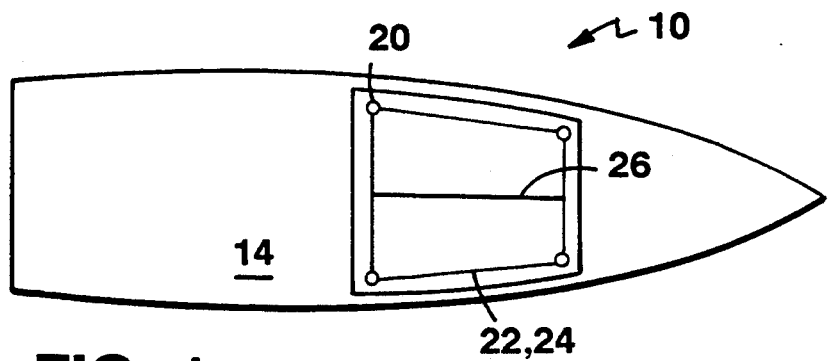
FIG. 1 is a plan view of a boat employing a sea bird-deterring system according to the invention.
Figure 2:
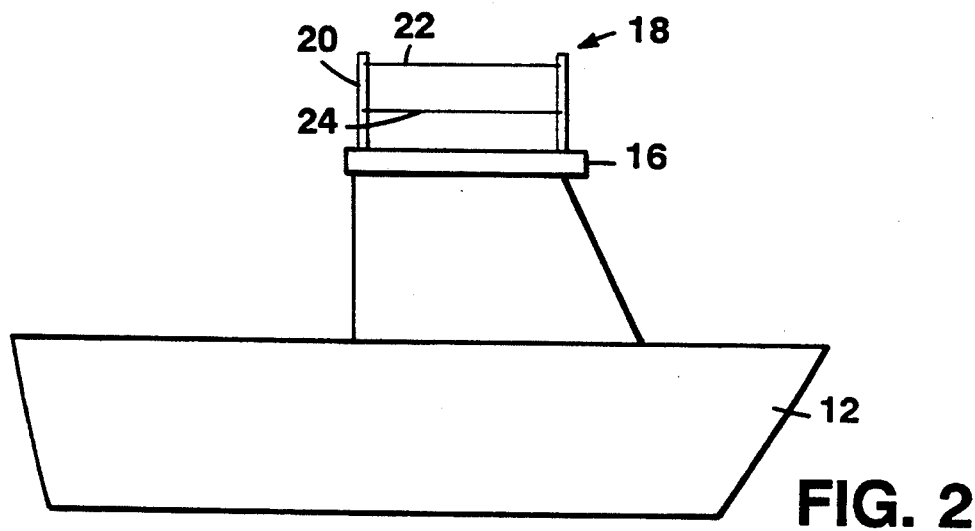
FIG. 2 is an elevation of the FIG. 1 boat.
Figure 3:
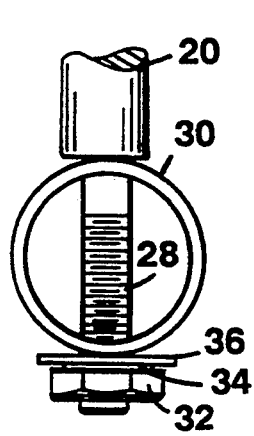
FIG. 3 is a partial elevation, partially in section, showing the mounting of a post of the FIG. 1 sea bird-deterring system.

Referring to FIGS. 1 through 3, there is shown motor boat 10 having shell 12, a deck 14 providing surfaces on which people walk, and hard top 16 over a cabin area at an elevation higher than deck 14. Supported on and extending above top 16 is sea bird-deterring system 18 including four vertical posts 20 and upper and lower horizontal lines 22, 24 between posts 20 near the perimeter of top 16. An additional horizontal line 26 is connected length-wise between the midsections of the front and back upper lines 22. Lines 22, 24, 26 are No. 18 braided nylon mason line, which is about 1/16" in diameter. Posts 20 are ⅜" diameter aluminum with holes at the top and midsections for receiving lines 22, 24. Line 24 is approximately 8" above top 16, and line 22 is approximately 17" above top 16. Referring to FIG. 3, it is seen that post 20 has threaded bottom end 28 which passes through holes in handrail 30, which is mounted along the edge of top 16. Alternately, threaded ends 28 could pass directly through holes in hard top 16. Post 20 is secured by nut 32, and lock nut 34 and flat washer 36 are under rail 30. Where the post 20 is directly connected to a hard top, an extra washer would be used on top of the hard top along with a sealing compound. It is desired to generally have a space of no more than about 3' between lines; thus, because top 16 is approximately 5' wide, which is significantly wider than 3', line 26 is used.

Figure 4:
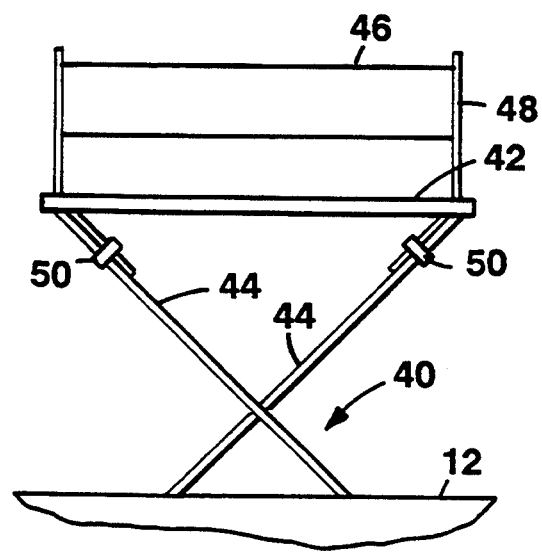
FIG. 4 is a elevation showing mounting of a sea bird-deterring system on a soft top of a boat.

Referring to FIG. 4, boat 40 includes a soft top 42 that is supported on crisscross frame 44 which is secured to the upper portion of a side wall of shell 12. Sea bird-deterring system 46 employs rods 48 that are bent at their lower ends at the approximate angle as the members of frame 44 and are secured to respective frame members by clamps 50. In the FIG. 4 system, posts 48 are ¼" in diameter.

Figure 5:
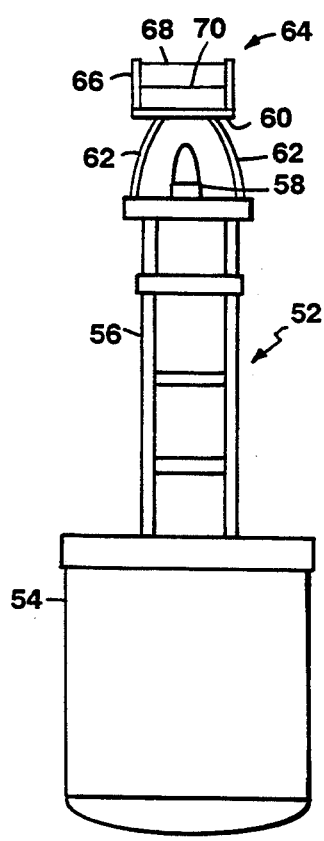
FIG. 5 is an elevation of a buoy employing a sea bird-deterring system according the invention.

Referring to FIG. 5, buoy 52 is shown. It includes a support structure of floating base 54 (including ballast) and frame 56 extending upward from base 54. Frame 56 supports electrically activated light 58, which is powered by a battery (not shown) that is recharged by solar panel 60, which is the top of buoy 52 and is supported by legs 62. Buoy 52 employs a sea bird-deterring system 64 that includes four posts 66 and upper horizontal line 68 and lower horizontal line 70 between adjacent posts along the periphery.

Figure 6:
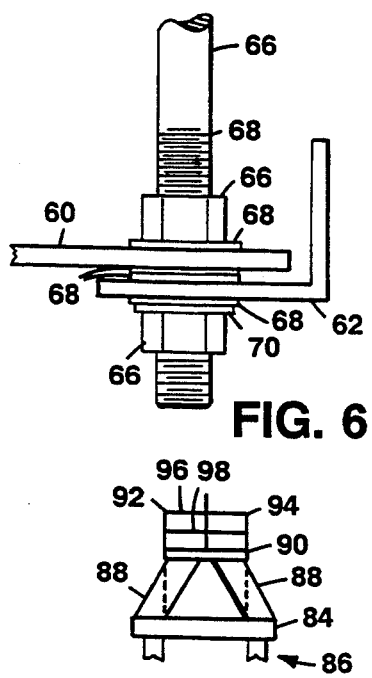
FIG. 6 is a partial elevation, partially in section, showing a mounting of a post of the FIG. 5 sea bird-deterring system.

Referring to FIG. 6, each post 66 has a ⅜" diameter threads 68 at its lower end. It is secured to solar panel 60 and frame 62 therefor between opposing nuts 66 and four flat washers 68 and lock washer 70.

Figure 7:
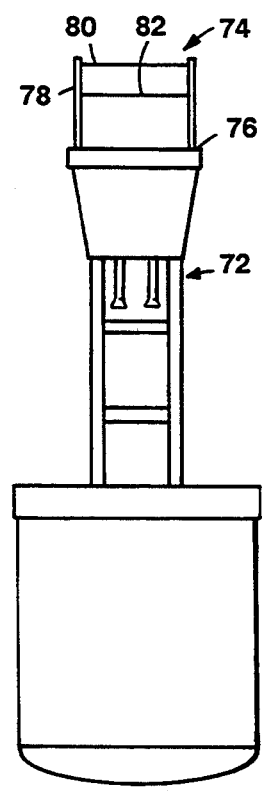
FIG. 7 is an elevation showing a different type of buoy with a sea bird-deterring system according to the invention.

Referring to FIG. 7, buoy 72, which does not include an electrically powered alarm, has sea bird-deterring system 74 mounted to top 76 of buoy 72. The sea bird-deterring system includes four posts 78 and upper horizontal lines 80 and lower horizontal lines 82. Top 76 is approximately 2½' in diameter.

Figure 8:
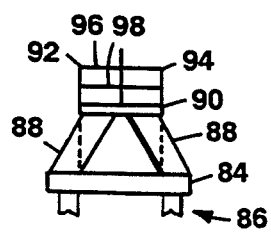
FIG. 8 is a partial elevation showing the mounting of a sea bird-deterring system on a different type of solar panel construction at the top of a buoy.

Referring to FIG. 8, top 84 of a solar panel powered buoy 86 is shown. It includes three solar panels 88 supported at their top edges by a horizontal triangular plate top 90. Sea bird-deterring system 92 having three posts 94 and upper and lower horizontal lines 96, 98 are used to deter birds from landing on top 90, where droppings could be deposited on panels 88.

Solar panels 60, 88 are square panels and are either 16.5" along an edge for a 10-watt panel, 22.5" along an edge for a 20-watt panel or 28.5" along an edge for a 35-watt panel. Horizontal lines 68, 70, 80, 82, 96, and 98 are approximately 17" and 8" above their respective tops.

The lines for the buoys in FIGS. 5–8 should be sufficient to deter sea gulls from landing on them. If cormorants, which are a much more aggressive bird, are prevalent in the area where the navigational aid will be used, cross-diagonal lines or other bisecting lines can be added. In addition to buoys, land-supported navigation aids can also use the sea bird-deterring systems according the invention. Also, in an application where there is a top with two angled plates meeting in a line or where the top is narrow and long, the sea bird-deterring system might employ only two posts and a line or two lines between them. In some applications, a single, horizontal line may be sufficient to deter birds from landing on the tops. In addition to nylon, other synthetic marine grade lines such as lines made of Dacron or other polyesters can be used.

Other embodiments of the invention are within the scope of the appended claims. E.g., the posts used on boats can desirably be removably mounted, e.g., by flanges or cups secured to a hard top or a frame for a soft top.

What is claimed is:

1. A boat comprising
    a boat shell,
    a deck on said shell providing surfaces to support people,
    a top at an elevation above said deck,
    at least two posts extending upward from said top, and
    at least one line between said posts at an elevation above said top to prevent sea birds from landing on said top, said elevation being greater than about 5" and less than about 20",
    wherein there are four said posts generally along the perimeter of said top, and said lines go generally along the perimeter of said top between posts, said lines along said perimeter defining a region having more than about 3' between said lines, said region having a generally square area, said lines being at two elevations,
    wherein there is an additional line bisecting the region within the perimeter such that there is a space of no more than about 3' between lines.

2. The boat of claim 1 wherein both said elevations are greater than about 5" and less than about 20".

3. The boat of claim 2 wherein one line is at a height of between 5" and 10", and another line is at a height of between 15" and 20".

4. The boat of claim 1 wherein an additional line is provided bisecting the region within the perimeter.

5. The boat of claim 1 wherein said top is a hard top, and said posts are anchored in holes through the hard top.

6. The boat of claim 1 wherein said top is a hard top having handrails secured thereto, and said posts are anchored in holes through said handrails.

7. The boat of claim 1 wherein said top is a soft top that is supported by a frame supported on the shell, and said posts are connected to the frame.

8. The boat of claim 1 wherein said line is marine grade synthetic plastic line.

9. The boat of claim 1 wherein said posts are aluminum rods less than 1" in diameter.

10. The boat of claim 1 wherein said posts are made of materials such as fiberglass.

11. A navigation aid comprising
    a support structure including a frame,
    a top carried by said frame,
    at least two posts extending upward from said top, and
    at least one line between said posts to prevent sea birds from landing on said top, at least one line being at an elevation above said top greater than about 5" and less than about 20",
    wherein said top is connected between the top edges of inclined solar panels carried by said frame, and
    wherein said top is triangular, and there are three said solar panels and three said posts.

* * * * *